J. W. BARNES.
MACHINE FOR SCARFING BOILER AND SHIP PLATES, CUTTING INCLINED KEYWAYS, OR OTHER PURPOSES.
APPLICATION FILED NOV. 17, 1919.
1,392,549.
Patented Oct. 4, 1921.
2 SHEETS—SHEET 1.
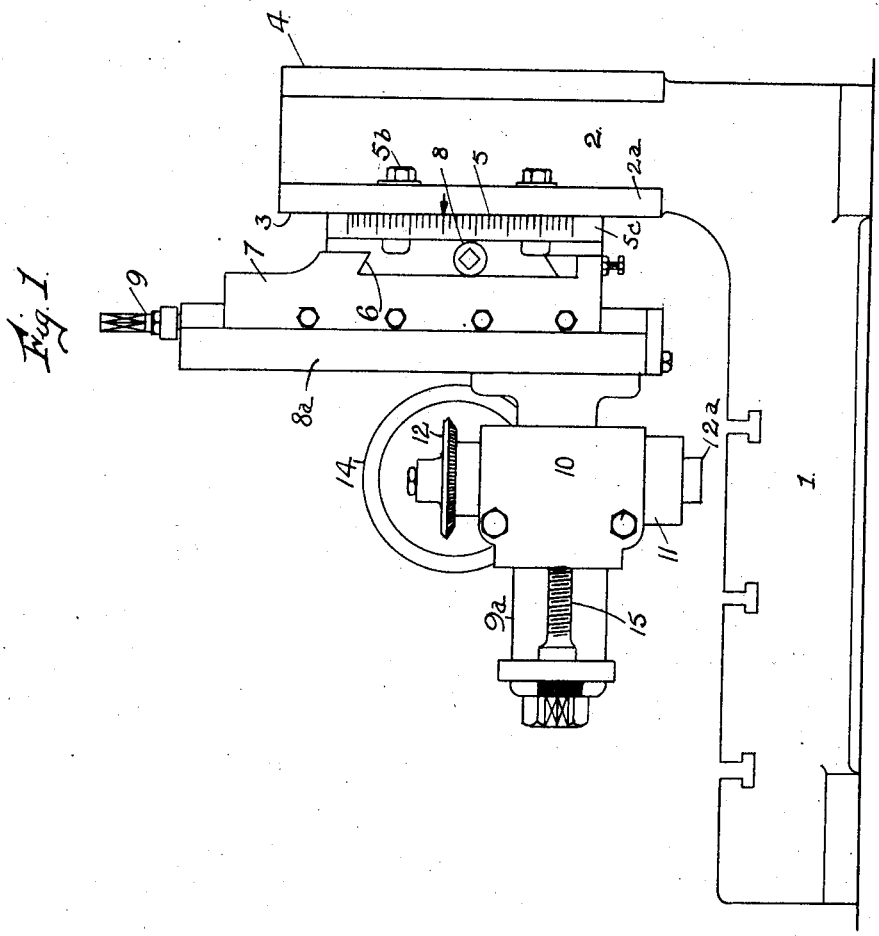
INVENTOR:-
J. W. Barnes,
By Henry T. Bright
Atty.

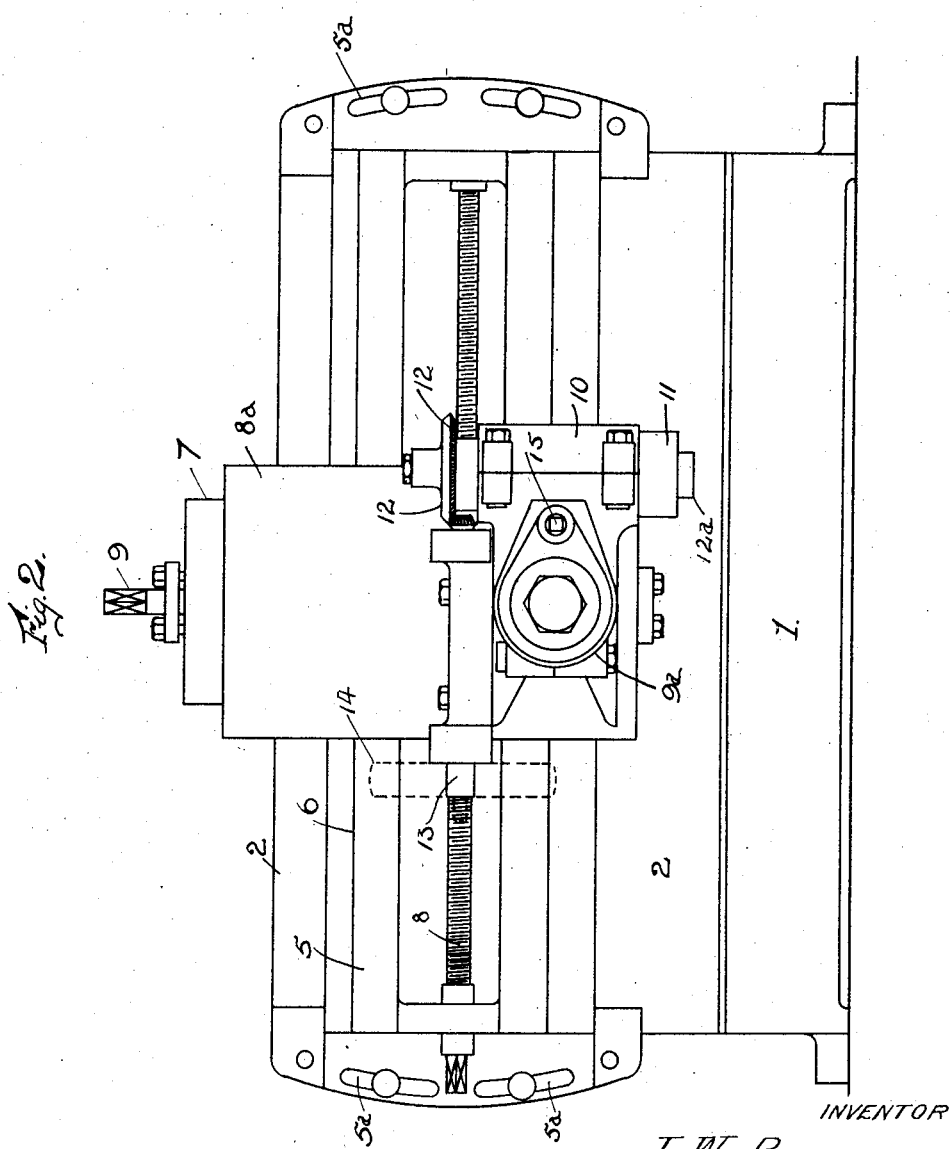

UNITED STATES PATENT OFFICE.

JOHN WILLIAM BARNES, OF CHESHIRE, ENGLAND.

MACHINE FOR SCARFING BOILER AND SHIP PLATES, CUTTING INCLINED KEYWAYS, OR OTHER PURPOSES.

1,392,549. Specification of Letters Patent. Patented Oct. 4, 1921.

Application filed November 17, 1919. Serial No. 338,535.

*To all whom it may concern:*

Be it known that I, JOHN WILLIAM BARNES, a subject of the King of Great Britain, and a resident of Cheshire, England, have invented certain new and useful Improvements in and Relating to Machines for Scarfing Boiler and Ship Plates, Cutting Inclined Keyways, or other Purposes, of which the following is a specification.

This invention relates to a machine whereby the edges of boiler or ship plates or the overlapping parts of ships' stems or the like may be scarfed or chamfered in order to permit of several overlapping plates or the like being riveted together, the machine being also available for other uses.

According to this invention, the machine comprises a bed plate and a vertical bracket integral therewith having one or two facings. Pivotally mounted on the facings is a guide upon which a slide is adapted to be traversed longitudinally by means of a screw, and an end of the guide is graduated so that it and the slide may be set at any desired inclination with respect to the bracket. The slide is itself formed as a guide and carries a secondary vertical slide so that a combined horizontal and vertical traverse of the second slide may be obtained. This secondary slide carries a milling attachment which is adapted to receive an end or other cutter rotated from a spindle driven through suitable gearing or otherwise from a shaft which in turn may be driven in any suitable manner.

The invention is illustrated in the accompanying drawings, in which Figure 1. is an end elevation and Fig. 2. a front elevation of a scarfing apparatus.

In carrying out the invention, the machine comprises a bed plate 1, and a bracket 2 which may be integral with or bolted to the bed plate, the bracket being provided with a single facing 3, or two facings 3 and 4. Mounted on one of these facings, so that it may be pivotally adjusted thereon, is a guide 5. The pivotal adjustment in the arrangement shown is effected by providing curved slots $5^a$ in the guide engaged by gripping bolts $5^b$. The guide 5 is provided with undercut edges 6 upon which is mounted a slide 7 adapted to be traversed longitudinally on the guide by means of a screw 8. The ends $5^c$ of the guide and $2^a$ of the bracket are graduated so that the guide 6 and the slide 7 may be set at any desired inclination relatively to the bed plate 1. This slide 7 is itself formed as a guide and carries a secondary vertical slide $8^a$ operated by a screw 9, so that a combined horizontal and vertical traverse of the second slide $8^a$ may be obtained. The secondary slide $8^a$ carries a bracket $9^a$ upon which is mounted in bearings 10 a milling attachment 11 which is adapted to receive in the lower socket $12^a$ an end or other cutter rotated from a spindle in the bearings 10 and driven through bevel gearing 12 from a shaft 13 which may be provided with a pulley 14 and be driven by a belt. The milling attachment 11 is provided with a third screw 15 so that the milling cutter when set at the desired inclination may be traversed as required after each cut.

In operation, in the case of scarfing a plate, the latter is positioned on the bed plate 1 of the device and clamped down and the main horizontal guide 5 is set by its graduated scale to the desired angle at which the scarfing is to cut. This adjustment also determines the angle of the cutting tool, and by means of the combined horizontal and vertical screw adjustments 8, 9, the cutting tool is then brought up to the work and being rotated from its driving mechanism, a cut is taken off by the feed movement of the screw 8. The cutter is then advanced by the traversing screw feed 15 and a second parallel cut is taken off, and so on until the desired width of scarfing has been done. When scarfing ships' stems the butt ends of the scarf may be trued off by taking a final cut with the screw feed 15, and for the purpose of insuring that the shoulder formed by this final cut shall be vertical to the plane of the plate or other work, instead of to the plane of the scarfing, the main slide 7 is reset to the normal position before this final finishing cut is taken off.

The bed plate 1 of the apparatus is of substantial construction upon which the plate or the like to be scarfed is fixed, and the milling attachment 11 normally overhangs this bed plate as shown. Where, however, it is desired to use the apparatus for scarfing machinery or other parts *in situ*, the vertical bracket 2 of the apparatus is provided with a second outer face 4 to which the main guide 5 may be similarly pivoted, this second face being on the opposite side of the vertical bracket.

While the invention has been described with reference to the operation of scarfing boiler or the like plates, it would be equally available for scarfing the overlapping parts of ships' stems or for sinking keyways in the coned ends of propeller shafts, or in fact for any similar purpose where a cut is required to be taken at any desired angle.

I claim:

1. Apparatus of the character described comprising a bed plate, a vertical bracket on the bed plate, a guide adjustably carried by said bracket, duplicate facings on said bracket, upon either of which the adjustable guide may be positioned, a pair of relatively adjustable slides carried by said guide, a milling attachment carried by one of said slides, and means for driving said milling attachment.

2. Apparatus of the character described comprising a bed plate to which the work is adapted to be secured, a vertical bracket on the bed plate, a guide angularly adjustable with respect to said bed plate, a primary slide adjustable in one direction on the guide, a secondary slide on the primary slide adjustable at right angles to the direction of adjustment of the primary slide, the secondary slide overhanging the bed plate, a milling attachment carried by said secondary slide, means for traversing the milling attachment in two directions, and means for driving the same.

3. An apparatus for scarfing boiler and ship plates, cutting inclined keyways, or other purposes, comprising, a bed plate to which the work is adapted to be secured, a vertical bracket on the bed plate upon which is mounted an angularly adjustable guide, duplicate facings on the bracket, upon either of which the adjustable guide may be positioned, a primary slide adjustable in one direction on the guide and a secondary slide on the primary slide adjustable at right angles to the direction of adjustment of the primary slide, the secondary slide carrying a milling attachment driven by a belt or other means, and means for traversing the milling attachment in two directions.

In testimony whereof I affix my signature in presence of two witnesses.

JOHN WILLIAM BARNES.

Witnesses:
A. J. DAVIES,
E. HEGINBOTHAM.